US009836695B2

United States Patent
Kozloski et al.

(10) Patent No.: US 9,836,695 B2
(45) Date of Patent: Dec. 5, 2017

(54) AUTOMATED DECISION SUPPORT PROVENANCE AND SIMULATION

(71) Applicant: International Business Machines Corporation, Armonk, NY (US)

(72) Inventors: James R. Kozloski, New Fairfield, CT (US); Michael P. Perrone, Yorktown Heights, NY (US); Clifford A. Pickover, Yorktown Heights, NY (US); Valentina Salapura, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 430 days.

(21) Appl. No.: 14/666,940

(22) Filed: Mar. 24, 2015

(65) Prior Publication Data

US 2016/0283848 A1 Sep. 29, 2016

(51) Int. Cl.
| | |
|---|---|
| *G06N 5/04* | (2006.01) |
| *G06F 17/30* | (2006.01) |
| *G06N 7/00* | (2006.01) |
| *G06Q 10/00* | (2012.01) |
| *G06Q 50/00* | (2012.01) |

(52) U.S. Cl.
CPC ............ *G06N 5/043* (2013.01); *G06Q 10/00* (2013.01); *G06Q 50/00* (2013.01)

(58) Field of Classification Search
USPC ....................................................... 709/224
See application file for complete search history.

(56) References Cited

U.S. PATENT DOCUMENTS

| | | | | |
|---|---|---|---|---|
| 2004/0015478 A1* | 1/2004 | Pauly | ............... | G06F 17/30327 |
| 2009/0281890 A1* | 11/2009 | Aliabadi | ............... | G06Q 30/02 |
| | | | | 705/14.34 |

(Continued)

FOREIGN PATENT DOCUMENTS

| | | |
|---|---|---|
| WO | 2007014325 A1 | 2/2007 |
| WO | 2009003762 A1 | 1/2009 |

OTHER PUBLICATIONS

Appendix P, List of IBM Patents or Patent Applications Treated as Related dated Aug. 3, 2015.

(Continued)

*Primary Examiner* — Jude Jean Gilles
(74) *Attorney, Agent, or Firm* — Cantor Colburn LLP

(57) ABSTRACT

Embodiments relate to supporting a decision making process. The method generates a graph that represents a decision making process. The graph comprises a plurality of nodes and a plurality of edges connecting the nodes. The nodes represent local decisions contributing to a global decision of the decision making process. Each node is associated with one or more parameters used for modeling the local decision. Each edge is associated with one or more parameters used for defining a relationship between two nodes. The method simulates the graph based at least in part on the parameters of the nodes and edges to derive an output global decision of the decision making process. The method receives a change to at least one of the parameters of the graph from a user and simulates the graph based at least in part on the at least one changed parameter to determine that the output global decision changes.

13 Claims, 6 Drawing Sheets

(56) References Cited

U.S. PATENT DOCUMENTS

| | | | |
|---|---|---|---|
| 2010/0077077 A1* | 3/2010 | Devitt | H04L 41/147 709/224 |
| 2010/0114627 A1 | 5/2010 | Adler et al. | |
| 2010/0299339 A1 | 11/2010 | Kementsietsidis et al. | |
| 2012/0001917 A1 | 1/2012 | Doganata et al. | |
| 2013/0007066 A1 | 1/2013 | Doganata et al. | |
| 2013/0325831 A1 | 12/2013 | Bao et al. | |
| 2014/0067989 A1 | 3/2014 | Gao et al. | |
| 2015/0149484 A1* | 5/2015 | Kelley | G06F 17/30398 707/748 |

OTHER PUBLICATIONS

James R. Kozloski, "Automated Decision Support Provenance and Simulation" U.S. Appl. No. 14/742,882, filed Jun. 18, 2015.
Yogesh L. Simmhan et al.; "A Survey of Data Prevenance Techniques"; Computer Science Department, Indiana University, Bloomington, IN 47405; Technical Report IUB-CS-TR618; Aug. 25, 2014; 25 pages.

* cited by examiner

AUTOMATED DECISION SUPPORT PROVENANCE AND SIMULATION

BACKGROUND

The present disclosure relates generally to supporting a decision making process, and more specifically to providing a decision support tool for retrospectively simulating a decision making process.

As decisions within an organization (e.g., a business organization) arise from within digital decision support environments such as a cognitive meeting room, digital artifacts (e.g., a meeting log) of a decision making process are generated at each level of an organization. However, the organizations are not provided with tools to organize such artifacts and to leverage for downstream manipulation and simulation of long decision chains, in support of better executive decisions, scenario exploration, and credit.

SUMMARY

Embodiments include a computer program product, a method, and a system for. According to an embodiment of the present disclosure, a computer program product for supporting a decision making process is provided. The computer program product comprises a computer readable storage medium having program instructions embodied therewith. The program instructions readable by a processing circuit cause the processing circuit to perform a method. The method generates a graph that represents a decision making process. The graph comprises a plurality of nodes and a plurality of edges connecting the nodes. The nodes represent local decisions contributing to a global decision of the decision making process. Each node is associated with one or more parameters used for modeling the local decision represented by the node. Each edge is associated with one or more parameters used for defining a relationship between two nodes connected by the edge. The method simulates the graph based at least in part on the parameters of the nodes and edges to derive an output global decision of the decision making process. The method receives a change to at least one of the parameters for at least one of the nodes and edges of the graph from a user. The method simulates the graph based at least in part on the at least one changed parameter to determine that the output global decision of the decision making process changes.

According to another embodiment of the present disclosure, a method of supporting a decision making process is provided. The method generates a graph that represents a decision making process. The graph comprises a plurality of nodes and a plurality of edges connecting the nodes. The nodes represent local decisions contributing to a global decision of the decision making process. Each node is associated with one or more parameters used for modeling the local decision represented by the node. Each edge is associated with one or more parameters used for defining a relationship between two nodes connected by the edge. The method simulates the graph based at least in part on the parameters of the nodes and edges to derive an output global decision of the decision making process. The method receives a change to at least one of the parameters for at least one of the nodes and edges of the graph from a user. The method simulates the graph based at least in part on the at least one changed parameter to determine that the output global decision of the decision making process changes.

According to a further embodiment of the present disclosure, a computer system for supporting a decision making process is provided. The computer system comprises a memory having computer readable instructions and a processor configured to execute the computer readable instructions. The instructions comprise generating a graph that represents a decision making process the graph comprising a plurality of nodes and a plurality of edges connecting the nodes. The graph comprises a plurality of nodes and a plurality of edges connecting the nodes. The nodes represent local decisions contributing to a global decision of the decision making process. Each node is associated with one or more parameters used for modeling the local decision represented by the node. Each edge is associated with one or more parameters used for defining a relationship between two nodes connected by the edge. The instructions further comprise simulating the graph based at least in part on the parameters of the nodes and edges to derive an output global decision of the decision making process. The instructions further comprise receiving a change to at least one of the parameters for at least one of the nodes and edges of the graph from a user. The instructions further comprise simulating the graph based at least in part on the at least one changed parameter to determine that the output global decision of the decision making process changes.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

As mentioned above, digital artifacts of a decision making process are generated at each level or decision point of an organization. Conventional decision support tools that generate the digital artifacts, however, are local to these decision points, meaning that these conventional tools do not support integration across multiple, arbitrary decision points within an organization in an enterprise environment. The decision points as used herein represent an event or a person from which a local decision originates. For instance, a meeting by a group of members to discuss and make a decision may be a decision point, and a person (e.g., a manager) who makes a local decision may be a decision point as well. The local decisions resulting at these decision points contribute to an overall or global decision for an organization.

The systems and methods of the embodiments of the present disclosure improve decision making processes for an organization and support retrospective simulations of overall or global decision making processes constrained by modification to the artifacts. That is, the systems and methods allow for simulations of "what if" scenarios by making different assumptions on artifacts (i.e., by modifying the artifacts after the fact). Moreover, the simulation results may be used to trace decision provenance, determine how current global decisions came to be, and determine critical inputs to the global decisions so that key assumptions may be easily identified and the validity and effects of the assumptions may be tested through simulation.

Specifically, in some embodiments, the systems and methods supply standard interfaces to decision support tools, such that when implemented, meeting logs, interventions, bias estimates, and outcomes and recommendations can contribute as decision nodes in a global decision graph. These nodes represent their contributions to an overall or global decision making process as weighted inputs to downstream nodes, which may span multiple meetings, discussions, and individual decision makers. Node outputs may be categorized and supply different interfaces to the global decision graphs. The decision dynamics within a node are further modeled by a decision making process modeling tool, such that group dynamics, slant, and changes in affiliation within a local decision making process can be represented over time in simulation of the node and graph. Perturbations to the graph can be used to test how dynamics in key meetings or in the organization as a whole, when altered, may have contributed to a different global decision.

Figure 1:
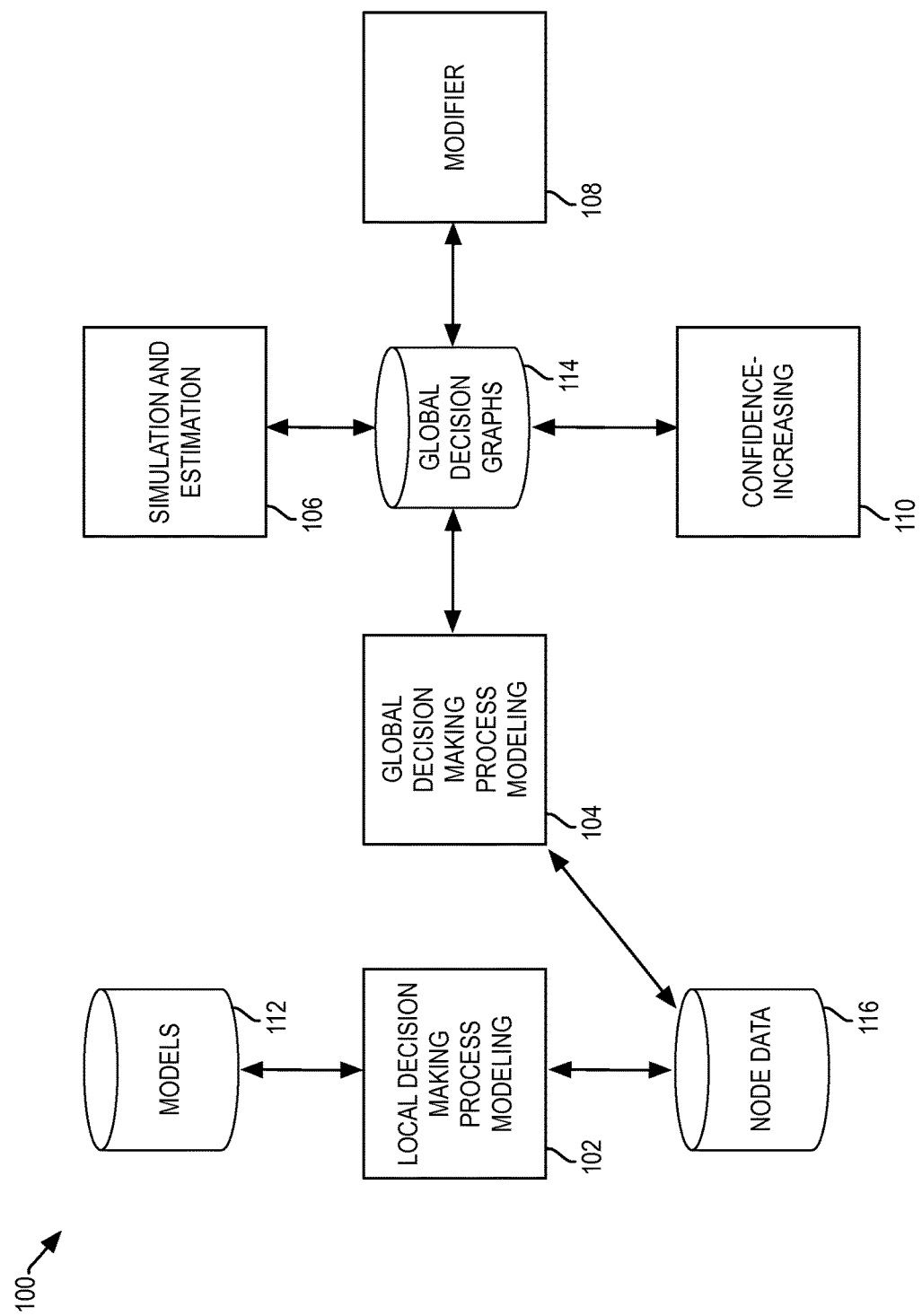
FIG. 1 depicts a system for supporting a global decision making process in accordance with some embodiments of the present disclosure.

FIG. 1 illustrates a system 100 for supporting a global decision making process for an organization in accordance with some embodiments of the present disclosure. As shown, the system 100 may include modules such as a local decision making process modeling module 102, a global decision making process modeling module 104, a simulation and estimation module 106, and a parameter modification module 108, and a confidence increasing module 110. The system 100 may also include a models repository 112, a graphs repository 114, and a node data repository 116.

The models repository 112 stores a plurality of different types of models that may be used to model a local decision making process at a decision point within an organization. The different types of models represent different types of local decision making processes. For instance, one type of model may be used to model a decision making process taken place during a meeting by a group of members of the organization. Another type of model may be used to model a decision making process performed by an individual decision maker (e.g., a manager) of the organization. Yet another type of model may be used to model a decision making process taken place through electronic communications (e.g., tweets, emails, online chats, etc.) between groups of members. Another type of model may be used to model a decision made in a form of document (e.g., a report).

In some embodiments, the different types of models are defined by different sets of parameters. For instance, one type of model for modeling a meeting by a group of members may include a parameter for describing an idea or a recommendation by a meeting participant, a parameter for indicating an approval or a disapproval of an idea of another meeting participant, a parameter for describing a role or a rank of a meeting participant, etc. The type of model for modeling an individual decision maker's decision may include a parameter for a role or a rank of the member, a parameter for a number of reports the member received and reviewed to make the decision, a parameter for describing contribution by each of the reports to the decision made by the member, etc. In some embodiments, a set of parameters for a model includes a parameter for time, in which a change may affect other time-variant parameters of the model. These time-variant parameters include a parameter for an iterative property.

As a simple example of a model and its parameters, a model is a threshold function that takes as inputs the parameters. The threshold function transform scalar inputs into binary outputs (e.g., Yes and No) if the confidence of the output decision is over a threshold value. More sophisticated models may be used. For instance, a model may be a mathematical model, a scientific model or a predictive model which takes as inputs the parameters of the model.

The local decision making process modeling module 102 generates data resulting from local decision making at different decision points of an organization. The local decision making process modeling module 102 generates digital artifacts resulting from performing a local decision making process (e.g., a meeting log for a meeting by a group of members of the organization). The local decision making process modeling module 102 then selects a suitable model from the models repository 112 and uses the selected model to model the local decision making process for a given decision point. In some embodiments, the local decision making process modeling module 102 learns and constructs a model from one or more sets of digital artifacts. The local decision making process may store the learned model in the models repository 112 for future use. The local decision making process modeling module 102 parameterizes the artifacts using the parameters of the selected or constructed model. The local decision making process modeling module 102 also specifies the local decision made at the given decision point. The local decision making process modeling module 102 stores the resulting local decision data (i.e., the parameter descriptions/values, the local decision, etc.) for each decision point in the node data repository 116.

The global decision making process modeling module 104 generates a global decision graph (not shown) representing a global decision making process. In some embodiments, the global decision graph is a directed graph having a plurality of nodes (or vertices) sequentially connected by a plurality of edges. An edge connects a node pair. The direction of an edge indicates that the node to which the edge is directed takes as input the output of the other node. In some embodiments, an edge may be associated with a weight (e.g., a real value between 0.0 and 1.0) that indicates the level of connectivity between the nodes. Each node represents a decision point within an organization, meaning that the local decision of one decision point (i.e., a node from which an edge is directed) influences the local decision of another decision point (i.e., a node to which the edge is directed). The node is associated with the node data generated by the local decision making process modeling module 102.

In addition, the global decision making process modeling module 104 defines one or more parameters for each of the plurality of edges, and sets the parameter with description and/or values. For instance, an edge may have a parameter for describing a relationship (e.g., a managerial relationship) between two members of the organization that are decision points. The parameters of an edge connecting two nodes are used by one node to integrate, transform, or interpret the information coming from the other node connected by the edge. In some embodiments, a node may have more than one edge directed from the node, and a node may have more than one edge directed to the node. As such, a global decision graph represents a global model for a global decision making process, and the models representing local decision making processes for the nodes of the global decision graph represent sub-models of the global model. The global decision modeling module 104 initializes the parameters of the edges and stores the resulting graph in the global decision graphs repository 114.

Figure 2:
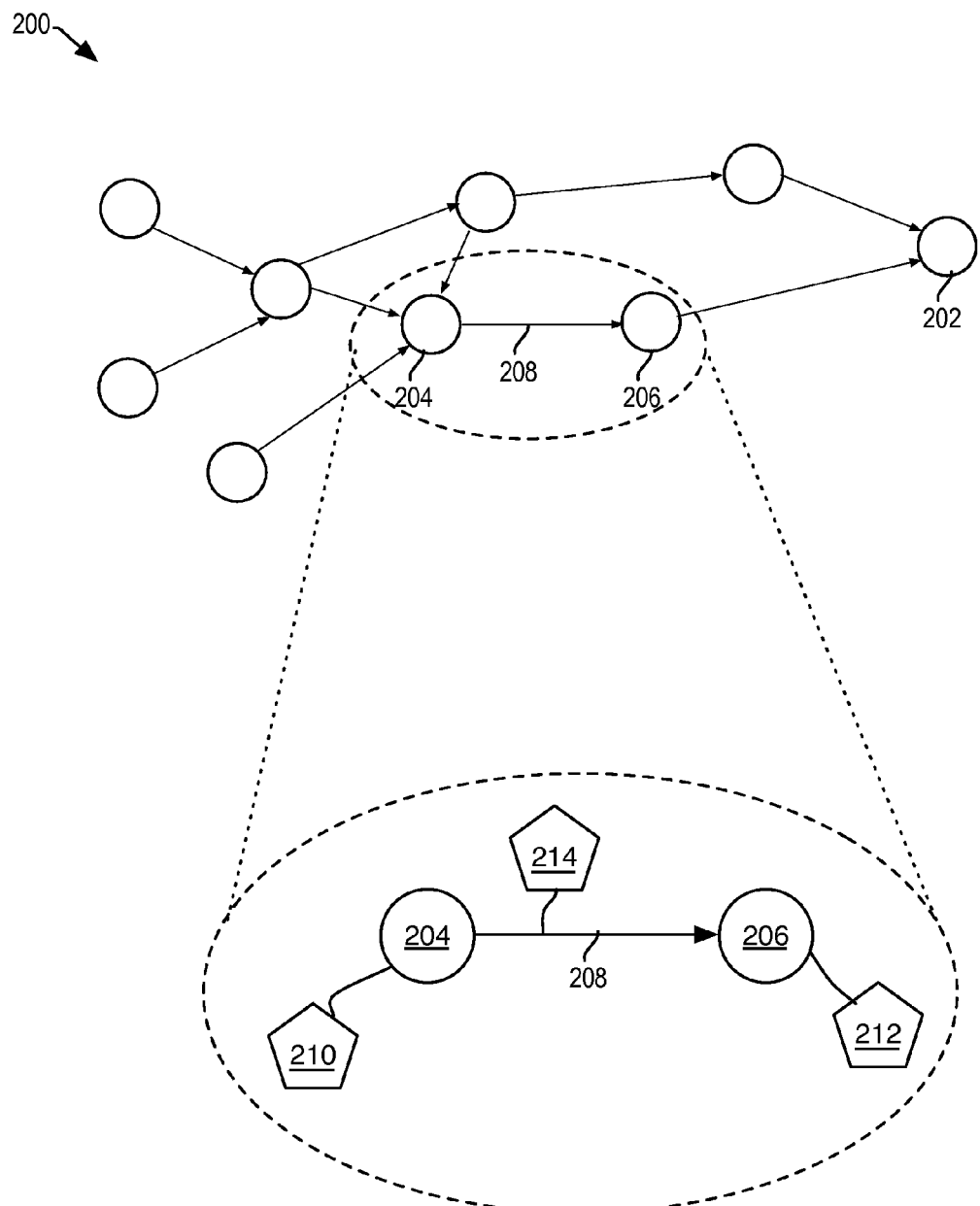
FIG. 2 depicts a global decision graph according to some embodiments of the present disclosure.

FIG. 2 illustrates a global decision graph 200 representing a global decision making process in accordance with some embodiments of the present disclosure. As shown, the global decision graph 200 has a plurality of nodes or vertices depicted as circles and a plurality of directed edges depicted as arrows that each connect a node pair. It is to be recognized that there may be numerous more nodes and edges than those depicted in FIG. 2. In some embodiments, node 202 that has edges directed to node 202 and has no edges directed from node 202 represents a global decision or the global decision maker (e.g., an executive member of a business organization).

The lower portion of FIG. 2 illustrates more details of the nodes and edges of the global decision graph 200. As an example, nodes 204 and 206 and edge 208 that connects nodes 204 and 206 are depicted. As shown, each of nodes 204 and 206 is associated with node data 210 or 212, which includes a set of parameters and a local decision made at the node. Edge 208 is associated with a set of parameters 214.

Referring back to FIG. 1, the simulation and estimation module 106 simulates a global decision graph stored in the global decision graphs repository 114 over time to represent and estimate the most likely process that gave rise to the current global decision. That is, the simulation and estimation module 106 simulates a flow of the local decisions that leads into the global decision represented by the global decision graph.

The modifier module 108 provides a user interface through which a user (of the system 100) may view or change (e.g., modify, add, or delete) the parameters associated with the nodes and edges of a global decision graph. The modifier module 108 allows a user to run "what if" scenarios by changing one or more parameters associated with the nodes and edges of a global decision graph using the provided interface. With the provided interface, the user may change not only the parameters of the nodes or edges that neighbor or point to a particular node representing a decision but also the parameters of the nodes and edges that do not neighbor or point to the particular node. The simulation and estimation module 106 then simulates the global decision making process by executing the global model represented by a global decision graph based at least in part on the changed parameter(s). Different global decisions may result from the simulations after changing one or more parameters. For instance, if the user changes a parameter of an edge that represents a managerial relationship between two persons represented by the node pair connected by the edge, the output local decision of the person receiving information from the other person may change, and the global decision may come out different. In some embodiments, the modifier module 108 allows the user to assign optimality of the global decision that result from parameter changes, and the modifier module 108 evaluates the quality of set of digital artifacts that is parameterized to the changed parameters based at least in part on the optimality. The modifier module 108 may display or report the evaluated quality to the user. In some embodiments, the modifier module 108 allows the user to rank the different global decisions in terms of, e.g., quality (good, bad, etc.) of the decisions, thereby allowing the user to identify specific local decisions that lead to good or bad global outcome. As such, the functioning of the system 100, which may be implemented in a computer system (e.g. computer system 12 described further below with reference to FIG. 4), may be improved.

By allowing a user to view or change the parameters associated with the nodes and edges of a global decision graph, the modifier module 108 facilitates user's traversal of the global decision graph to trace the decision provenance—a lineage of the decision or a line of data contributed to the decision. In some cases, however, the provenance of an idea contributed to a decision is not known with 100% certainty. The confidence increasing module 110 takes one or more confidence increasing action if the confidence of a local decision is below a threshold value. In such cases, the confidence increasing module 110 takes a confidence increasing action, which may include any of sending one or more emails (e.g., to participants of a meeting in order to obtain more information), the use of databases (e.g. electronic calendars to better determine who was invited to a meeting and their titles at the time of the meeting, and to map actual people names to avatars at a meeting in a virtual world), social-network analysis (e.g., to better understand relationships between people interacting at a node), etc.

In some embodiments, the social-network analysis may also optionally include an analysis of one or more of the following for members in a social network: Degree centrality, Betweenness centrality, Closeness centrality, Eigenvalue, Hub and Authority. As part of the user interface for the provenance determination, the confidence increasing module 110 may optionally include visualization tools related to social networks. In this manner, the system 100 may be used not only to determine provenance but also to potentially foster useful dissemination of ideas in the future and in future meetings.

In some embodiments, the threshold value that the confidence increasing module 110 uses to determine whether to take a confidence increasing action may be set by a user or the threshold value may be determined in an automated fashion. For instance, if knowing the provenance with near 100% accurateness is important (e.g., for legal reasons, for assignments of monetary awards, etc.), then the threshold value may be set to a relatively high value.

Figure 3:
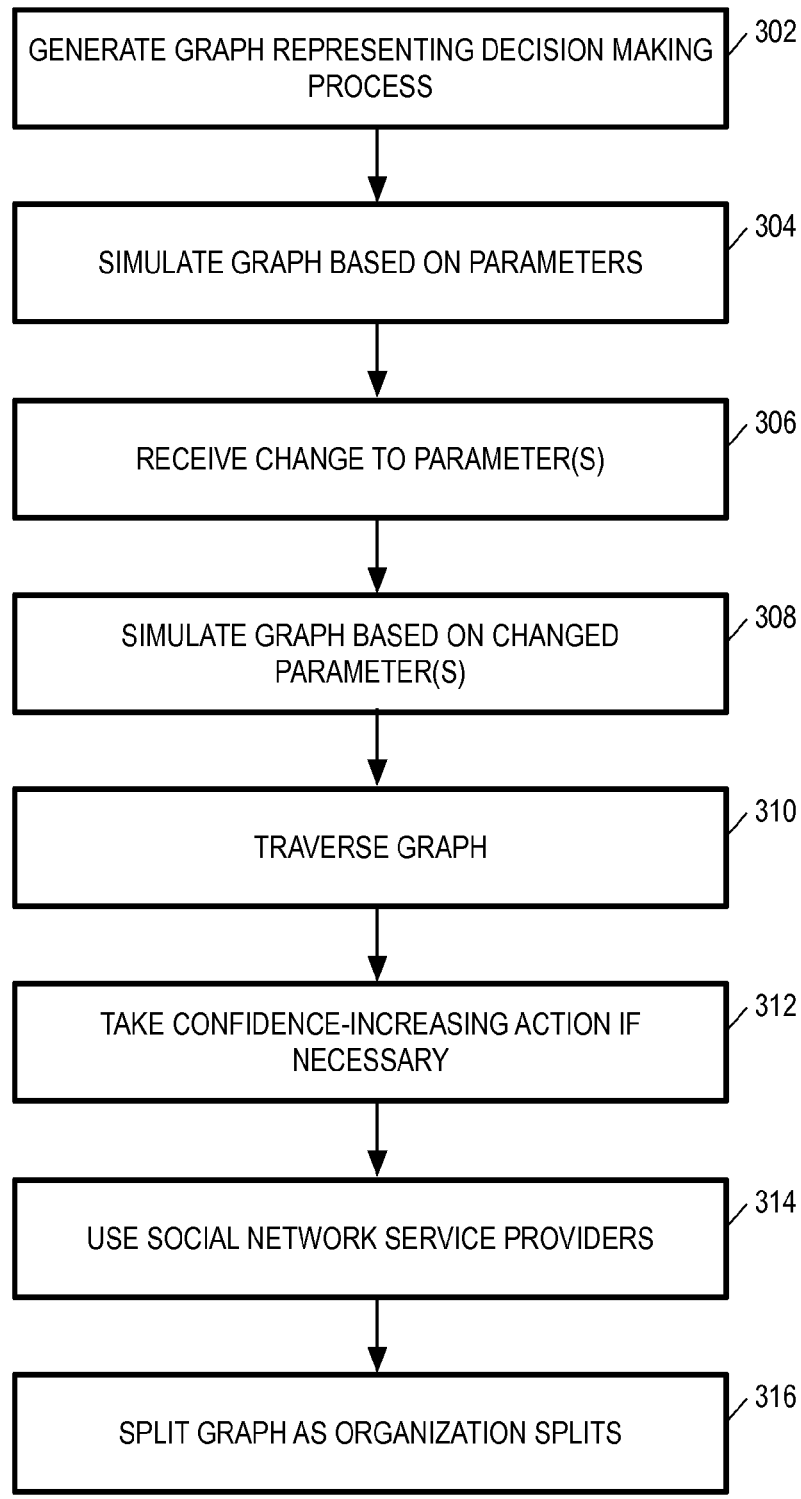
FIG. 3 depicts a process flow for supporting a decision making process according to some embodiments of the present disclosure.

FIG. 3 illustrates a process flow for supporting a decision making process. In some embodiments, the system 100 performs the process flow shown in FIG. 1. At block 302, the system 100 generates a graph that represents a decision making process. The graph comprises a plurality of nodes and a plurality of edges connecting the nodes. The nodes represent local decisions contributing to a global decision of the decision making process. Each node is associated with one or more parameters used for modeling the local decision represented by the node. Each edge is associated with one or more parameters used for defining a relationship between two nodes connected by the edge. Specifically, in some embodiments, the system 100 selects a model from a plurality of different models. Each model is associated with a different set of parameters. The system 100 derives the local decision represented by the node by executing the selected model using the set of parameters for the model. At block 304, the system 100 simulates the graph based at least in part on the parameters of the nodes and edges to derive an output global decision of the decision making process.

At block 306, the system 100 receives a change to at least one of the parameters for at least one of the nodes and edges of the graph from a user. That is, in some embodiments, the system 100 allows the user to change more than one parameter for more than one node or edge. As such, the system 100 allows the user to identify which parameters are the most important to specific decisions and to identify which parameters lead to the "best" decision. At block 308, the system 100 simulates the graph based at least in part on the at least one changed parameter to determine whether the output global decision of the decision making process changes. The system 100 may display or report the simulation results to the user. The simulation results may detect and report both a "change" state and a "no change" state in the output global decision, and it may also detect and report only the "change" state in the output global decision such that the "no change" state is inferred from the lack of a report. Thus, system 100 may determine "whether" the output global decision of the decision making process changes, and system 100 may determine "that" the output global decision of the decision making process changes.

At block 310, the system 100 traverses the graph to accumulate and assign provenance to a contribution to the output global decision of the decision making process. At block 312, the system 100 computes a confidence level of the provenance and triggers a confidence-increasing action when the confidence level is below a threshold value.

In some embodiments, at least one of the nodes represents an outcome of a meeting held by a plurality of individuals involved in the decision making process, and the system 100 at block 314 uses one or more social network service providers to disseminate ideas for any further meetings to the individuals. In some embodiments, the system 100 identifies behavior characteristics of the meeting and parameterizes the behavior characteristics to use to model the contribution of the node to the global decision.

In some embodiments, the decision making process is for an organization, and the system 100 at block 316 splits the graph into two or more graphs when the organization splits.

In some embodiments, the global decision graph modeling process described above may be extended into the "future" so as to suggest useful fictional nodes (e.g., meetings), or kinds of meetings to be suggested in the future. A global decision graph of some embodiments may be used to identify areas of competence and expertise in an organization. In some embodiments, two or more global decision graphs may be merged and split as the organizations merge and split. In some embodiments, graphs may be bought and sold.

Although the above embodiments of the present disclosure is described in the context of business applications, it is to be noted that other kinds of users, in their daily lives, may be interested in provenance of ideas, and thus the embodiments of the present disclosure may function as a cognitive aid to users in family situations and small-business situations involving homeowners. Although the embodiments of the present disclosure are directed toward idea provenance, it is to be noted that the provenance of "emotions" and related cognitive features may be tracked, at least in part.

In some embodiments, behavioral or cognitive characteristics may be incorporated into the global decision graph modeling process (e.g., as metadata or by other means). Thus, information related to the cognitive "style" for the meeting as a whole (i.e., a node as a whole), or portions of the node (e.g., one or more individual meeting participants) may be stored along with the global decision graph. Similarly, in meetings, the participants may become angry or dejected, and the provenance of such "emotions" may be gleaned through time. For example, a first meeting may have had very happy meeting participants, when suddenly, a $27^{th}$ meeting or node) and other nodes featured angry members. It would be useful to know at which meetings such emotions started, even if the individual meeting participants became suddenly dejected years ago.

Embodiments disclosed herein will now be further illustrated by the following example. One or more embodiments discover and simulate how one meeting (a meeting is an example of a "node") contributes to the next. As an example, consider that during a meeting John called out, "use security method X for cloud Y," and this is recorded by the meeting recorder. It may be further assumed that the idea actually had merit and is brought up at a subsequent meeting, in some sense, spreading the meme. One or more embodiments of the present disclosure will track the spread in a dynamic graph model of the decisions as they flow, into a recommendation to a decision maker. The decision maker can then discover that this "meeting decision node" on Dec. 19, 2013 seems important in my simulation—and then look more closely to find that John suggested it (if she cares). Because all meetings have outcomes, these outcomes contribute to decisions even if they are negative outcomes (as would be the case if John's suggestion is ignored). Hence, all meetings are decision nodes. To find out who suggested something, it is necessary to know where it came from in the graph, i.e., the provenance. If John is in a meeting, and if 5 suggestions are given, and if all 5 are ignored, the outcome of that meeting is 5 negative outcomes. Thus, the tree has been pruned and the "future" changed. This also can provide the ability to later discover how certain options came to be ignored.

As another example, Jane always makes good suggestions, but Harry ignores her. Further, he subtly refuses to even pick up an idea from Jane. Hence, Harry is making a decision to always "not use Jane's idea." One or more embodiments of the present disclosure may be used to detect this situation. The "decision node" in the present disclosure is therefore not an individual contribution, but rather is part of a system that operates between the nodes and represents each use of a known heterogeneous tool for manipulating the node as a "decision node." Thus, the node in accordance with the present disclosure is an arena in which a decision might be made and necessarily has digital artifacts associated with it.

It is understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
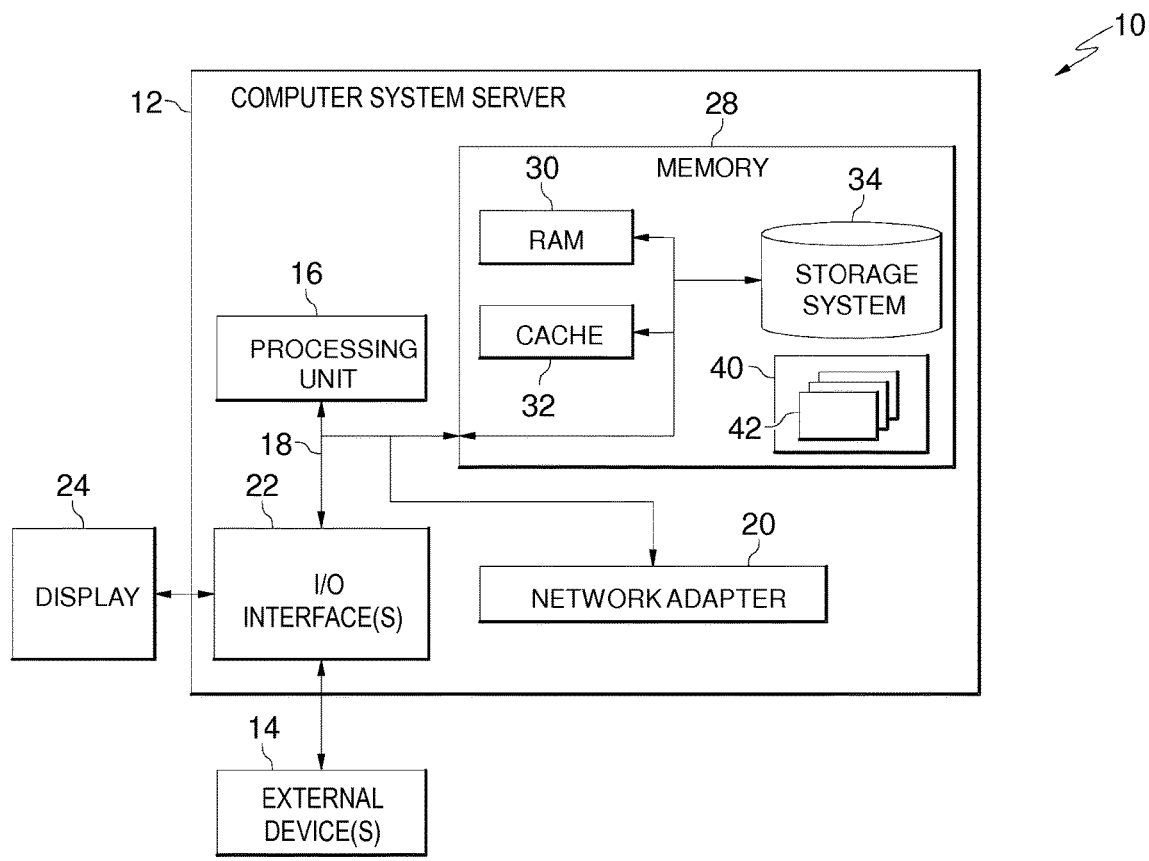
FIG. 4 depicts a cloud computing node according to some embodiments of the present disclosure.

Referring now to FIG. 4, a schematic of an example of a cloud computing node is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the present disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the present disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
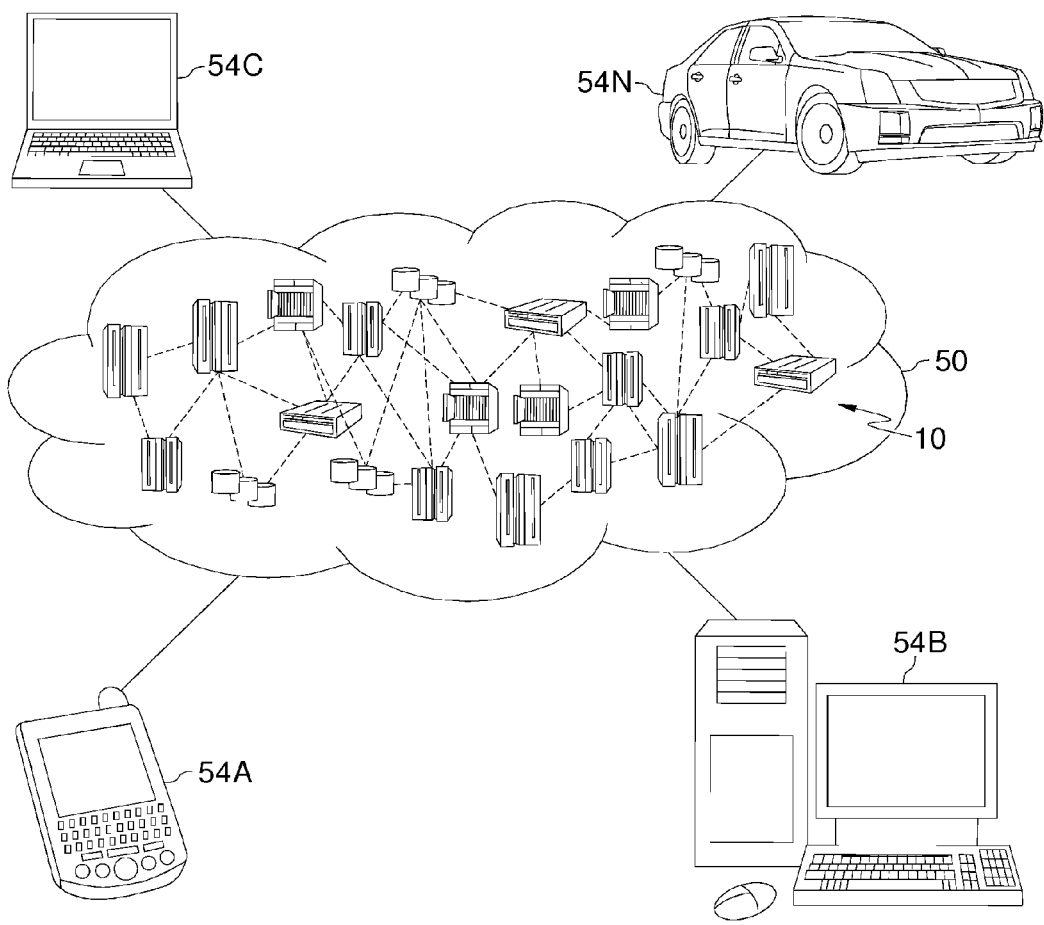
FIG. 5 depicts a cloud computing environment according to some embodiments of the present disclosure.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
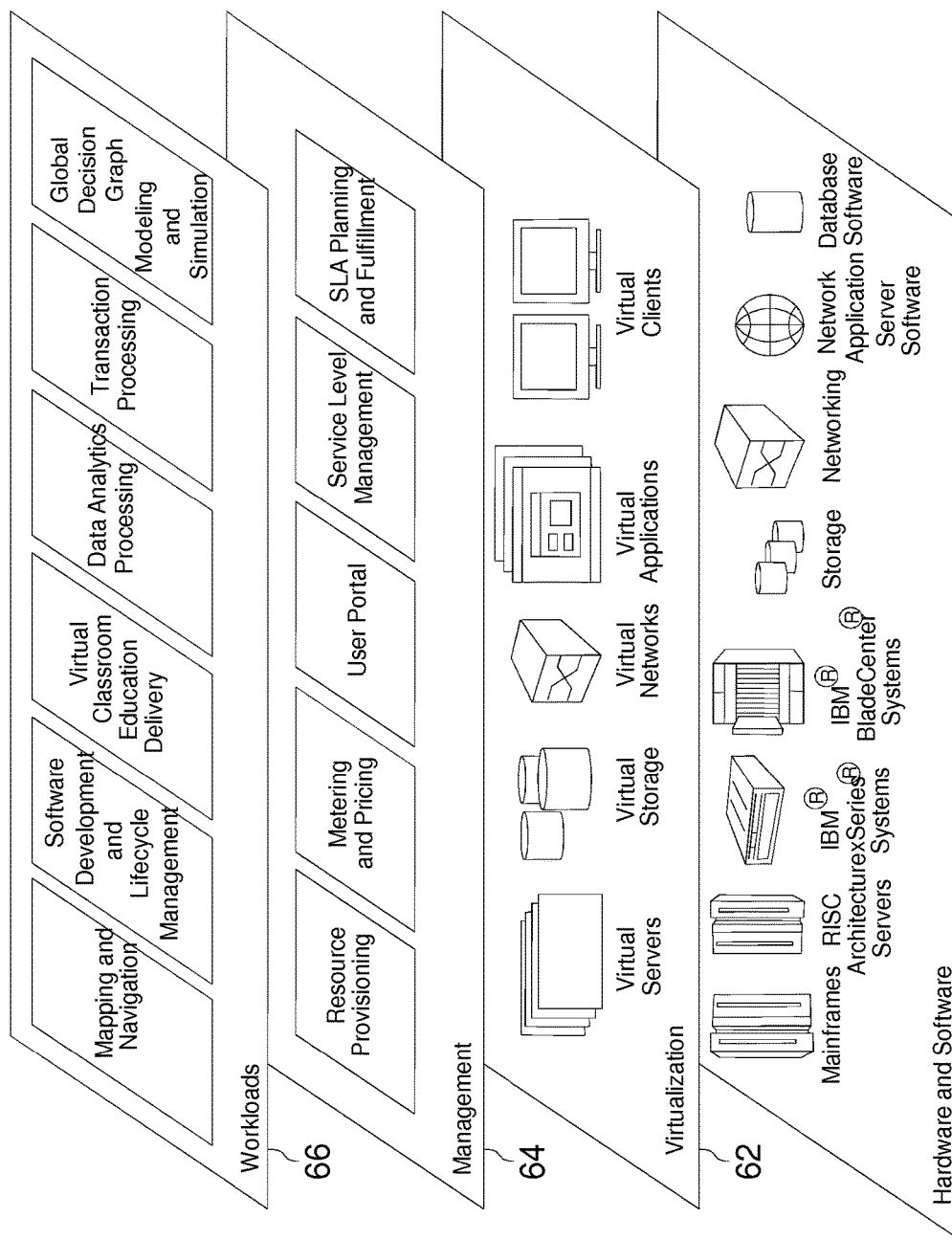
FIG. 6 depicts abstraction model layers according to some embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the present disclosure are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and global decision graph modeling and simulation.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. For example references herein to operations performed by a single processor circuit or a single memory may be performed by a single processor/memory, or by multiple processors/memories working in tandem. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product, comprising:
a computer readable storage medium having program instructions embodied therewith, wherein the computer readable storage medium is not a transitory signal per se, the program instructions readable by at least one processing circuit to cause the at least one processing circuit to perform a method of supporting a decision making process, the method comprising:
generating, by the at least one processor circuit, a graph that represents a decision making process, the graph comprising a plurality of nodes and a plurality of edges connecting the nodes, the nodes representing local decisions contributing to a global decision of the decision making process, each node associated with one or more parameters used for modeling the local decision represented by the node, each edge associated with one or more parameters used for defining a relationship between two nodes connected by the edge;
simulating, by the at least one processor circuit, the graph based at least in part on the parameters of the nodes and edges to derive an output global decision of the decision making process;
receiving a change to at least one of the parameters for at least one of the nodes and edges of the graph from a user; and
simulating the graph based at least in part on the at least one changed parameter to determine that the output global decision of the decision making process changes.

2. The computer program product of claim 1, wherein the generating a graph comprises, for each node:
selecting a model from a plurality of different models, each model associated with a different set of parameters; and
deriving the local decision represented by the node by executing the selected model using the set of parameters for the model.

3. The computer program product of claim 1, wherein the method further comprises traversing the graph to accumulate and assign provenance to a contribution to the output global decision of the decision making process.

4. The computer program product of claim 3, wherein the method further comprises:
computing a confidence level of the provenance;
triggering a confidence-increasing action when the confidence level is below a threshold value.

5. The computer program product of claim 1, wherein at least one of the nodes represents an outcome of a meeting held by a plurality of individuals involved in the decision making process, wherein the method further comprises using one or more social network service providers to disseminate ideas for any further meetings to the individuals.

6. The computer program product of claim 1, wherein at least one of the nodes represents an outcome of a meeting held by a plurality of individuals involved in the decision making process, wherein the method further comprises:
identifying behavioral characteristics of the meeting; and
parameterizing the behavioral characteristics to use to model the contribution of the node.

7. The computer program product of claim 1, wherein the decision making process is for an organization, wherein the method further comprises splitting the graph into two or more graphs when the organization splits.

8. A computer system for determining a crowd behavior, the system comprising:
at least one memory having computer readable instructions; and
at least one processor configured to execute the computer readable instructions, the instructions comprising:
generating a graph that represents a decision making process, the graph comprising a plurality of nodes and a plurality of edges connecting the nodes, the nodes representing local decisions contributing to a global decision of the decision making process, each node associated with one or more parameters used for modeling the local decision represented by the node, each edge associated with one or more parameters used for defining a relationship between two nodes connected by the edge;
simulating the graph based at least in part on the parameters of the nodes and edges to derive an output global decision of the decision making process;
receiving a change to at least one of the parameters for at least one of the nodes and edges of the graph from a user; and
simulating the graph based at least in part on the at least one changed parameter to determine that the output global decision of the decision making process changes.

9. The computer system of claim 8, wherein the generating a graph comprises, for each node:
selecting a model from a plurality of different models, each model associated with a different set of parameters; and
deriving the local decision represented by the node by executing the selected model using the set of parameters for the model.

10. The computer system of claim 8, wherein the instructions further comprise traversing the graph to accumulate and assign provenance to a contribution to the output global decision of the decision making process.

11. The computer system of claim 10, wherein the instructions further comprise:
computing a confidence level of the provenance;
triggering a confidence-increasing action when the confidence level is below a threshold value.

12. The computer system of claim 8, wherein at least one of the nodes represents an outcome of a meeting held by a plurality of individuals involved in the decision making process, wherein the method further comprises using one or more social network service providers to disseminate ideas for any further meetings to the individuals.

13. The computer system of claim 8, wherein at least one of the nodes represents an outcome of a meeting held by a plurality of individuals involved in the decision making process, wherein the method further comprises:
identifying behavioral characteristics of the meeting; and
parameterizing the behavioral characteristics to use to model the contribution of the node.

* * * * *